Feb. 2, 1943.  R. H. HILL  2,310,080
NON-OVERFILL DEVICE
Filed Jan. 8, 1940

INVENTOR
Robert H. Hill
BY
Spencer, Hardman & Fehr
his ATTORNEYS

Patented Feb. 2, 1943

2,310,080

UNITED STATES PATENT OFFICE 2,310,080

NONOVERFILL DEVICE

Robert H. Hill, Anderson, Ind., assignor to General Motors Corporation, Detroit, Mich., a corporation of Delaware Application January 8, 1940, Serial No. 312,819

2 Claims. (Cl. 251—144)

This invention relates to non-overfill devices for storage batteries and other electrolyte cells.

An object of the present invention is to provide a resilient valve closing means for the filler opening of a storage battery which will not be corroded by the electrolyte of the storage battery.

Another object of the invention is to provide a novel valve which will incorporate a helical coil spring made of insulating material, such as molded "Bakelite."

Further objects and advantages of the present invention will be apparent from the following description, reference being had to the accompanying drawing wherein a preferred embodiment of the present invention is clearly shown.

Figure 1:
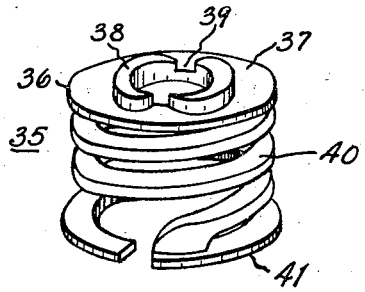
Fig. 1 is a perspective view of a resilient vent valve made of molded "Bakelite."
Figure 1A:
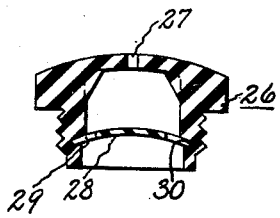
Fig. 1A is a sectional view of a filler plug.
Figure 2:
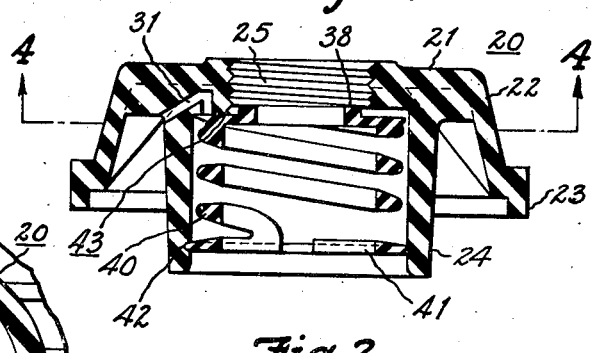
Fig. 2 is a sectional view of a storage battery cell cover showing the resilient vent valve molded from "Bakelite" or any resisting material in its closed position, the filler plug or cap being removed as shown in Fig. 1A.
Figure 4:
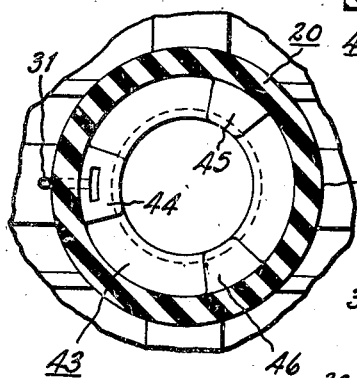
Fig. 4 is a sectional view taken on the line 4—4 of Fig. 2.
Figure 5:
Fig. 5 is a sectional view on an enlarged scale showing the construction of the convolutions comprising the resilient portion of the valve.

Referring to Fig. 2, a battery cell cover 20 comprises a top wall 21 and side walls 22 having a flange 23 adapted to rest on ledges provided by the walls of a battery cell, not shown. The top wall 21 of the cover is provided with a depending annular skirt 24 which extends to substantially the desired level of the electrolyte in the battery cell. The skirt is substantially concentric with a tapped filler opening 25 which is adapted to receive a filler plug 26 provided with a vent opening 27. A baffle plate 28 having a plurality of notches 29 on its periphery is snapped into an annular groove 30 provided by the filler plug.

The cover 20 is provided with a by-pass 31 connecting the space exterior to the skirt 24 with the space within the skirt. The by-pass 31 is controlled by a resilient valve 35 made of hard insulating material such as "Bakelite" or other suitable acid resisting material. The valve 35 comprises a top ring portion 36 having a flat upper surface 37 provided with an interrupted boss 38 separated by notches 39. The ring portion 36 has a spring portion 40 depending from the lower surfaces which terminates into a C-washer portion 41. The C-washer portion is greater in cross dimension than the ring 36 and spring portions 40. The C-washer portion 41 of the valve member 35 is snapped into a groove 42 provided by the skirt 24 compressing the spring portion 40 to urge the ring portion 36 against a seat 43, which includes three pads 44, 45 and 46 to provide a three point bearing for the ring portion 36.

Figure 3:
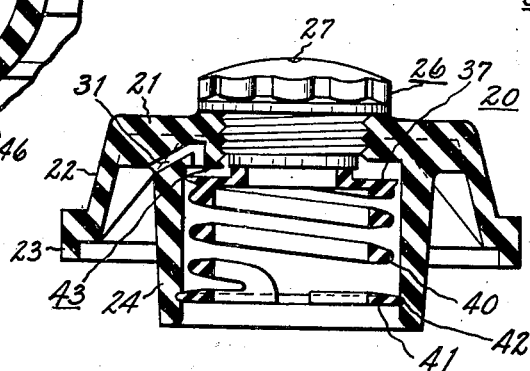
Fig. 3 is a view similar to Fig. 2 showing the filler plug screwed into position and the vent valve open.

When the filler cap 26 is screwed into the position to close the filler opening 25, as shown in Fig. 3, the lower edge of the cap engages the boss 38. The spring portion 40 yields to allow the ring portion 36 to be removed from the seat 43 to open the by-pass 31 in order to vent the space above the electrolyte level and the exterior of the skirt 24. The venting of the space above the electrolyte is through the by-pass 31, which is in communication with the space within the skirt which is open to outside atmosphere through the notches 39, the notches 29 of the baffle plate 28 and the vent opening 27 of cap 26.

When the cap 26 is unscrewed so as to remove it from the cover 20, as shown in Fig. 2, to permit liquid to be added in the cell through the filler opening 25, the spring portion 40 of the valve will expand urging the ring portion 36 upwardly until the flat portion 37 engages the pads 44, 45 and 46, thereby closing the by-pass 31, so that air will be trapped in the space between the exterior of the skirt 24 and the side walls 22 of cover 20 and the battery cell. As the liquid is poured through the opening 25, the liquid will rise until it contacts with the lower edge of the skirt 24. When this occurs the air will be trapped in the space heretofore mentioned whereupon the additional liquid will fill the space interior of the skirt 24. When this happens it is an indication that the electrolyte has been brought up to the proper level. Since the air is trapped it is impossible to overfill the cell with liquid as there is no place for the air to escape.

When the filler plug 26 is screw threaded into the filler opening 25, as shown in Fig. 3, the by-pass 31 is open to atmosphere so as to relieve the pressure of the air trapped in the space exterior of the skirt 24. In consequence the liquid within the space interior of the skirt will recede until the liquid reaches a common level within the cell.

While the embodiment of the present invention as herein disclosed, constitutes a preferred form, it is to be understood that other forms might be adopted, all coming within the scope of the claims which follow.

What is claimed is as follows:

1. A one-piece valve, helical-coil spring and resilient split washer member made of molded material, the inner surface of the turns of the spring being coincident with a cylinder whose axis is the axis of the spring, said inner surface joining helical side surfaces of the turns inclined in opposite directions with respect to the axis of the spring, the end turns of the spring being respectively integral with the valve and the washer.

2. The combination of a spiral spring having the resilient characteristics of a hard body of moldable non-metallic acid resisting material of which the side surfaces of the spiral convolutions are substantially flat and tapered in opposite directions away from the axis of the convolutions; a valve member moldable of the same material and formed integral with one end of the spring; and a split washer of greater cross dimensions than the convolutions and moldable of the same material formed integral with the other end of the spring, said washer adapted to be anchored to a support by the radial resiliency of the washer to permit the valve member to move axially relative to the normal fixed position of said washer.

ROBERT H. HILL.